United States Patent [19]

Buus et al.

[11] 4,363,098

[45] Dec. 7, 1982

[54] ELECTRIC COMMAND SPOILER SYSTEM

[75] Inventors: Henning Buus; Thomas D. MacFie, both of Woodinville; Odd Justad, Issaquah, all of Wash.

[73] Assignee: The Boeing Company, Seattle, Wash.

[21] Appl. No.: 162,458

[22] Filed: Jun. 24, 1980

[51] Int. Cl.³ .................................................. G05D 1/08
[52] U.S. Cl. .................................. 364/434; 244/90 A; 244/175; 318/563; 364/150; 364/187
[58] Field of Search ................ 364/434; 318/564, 580, 318/585, 563; 244/175, 181, 90 R, 90 A

[56] References Cited

U.S. PATENT DOCUMENTS

| | | | |
|---|---|---|---|
| 2,612,329 | 9/1952 | Crandall et al. | 244/217 |
| 3,636,324 | 1/1972 | Dommasch | 364/434 |
| 3,787,009 | 1/1974 | Wheldon | 244/227 |
| 4,087,065 | 5/1978 | Arnquist et al. | 244/90 R |
| 4,130,241 | 12/1978 | Meredith et al. | 318/564 |
| 4,143,839 | 3/1979 | Antonov et al. | 244/90 A |
| 4,261,537 | 4/1981 | Tisdale, Sr. et al. | 364/434 |

OTHER PUBLICATIONS

Boeing 747 Maintenance Manual, "Spoiler Control System-Description and Operation", Apr., 1975, pp. 1-15.
Panavia Tornado, "Flight Control System", 1978.

*Primary Examiner*—Errol A. Krass
*Attorney, Agent, or Firm*—James P. Hamley; Nicolaas DeVogel; Bernard A. Donahue

[57] ABSTRACT

An aircraft spoiler control system wherein each of a plurality of spoilers is driven by an electrically responsive actuator. Sense signals representative of the aircraft's control wheel rotation, speedbrake lever deflection, flap position and air/ground status are processed by logic which produces a corresponding control signal for each actuator. Fault detection circuitry switches in a back-up actuator control signal if a fault occurs in the active control circuit.

7 Claims, 11 Drawing Figures

ELECTRIC COMMAND SPOILER SYSTEM

BACKGROUND OF THE INVENTION

The present invention pertains to the aircraft control art and, more particularly, to an electrically controlled aircraft spoiler system.

Numerous spoiler control systems have been developed in the aircraft art. Initially, spoilers were used solely as air brakes. However, in modern commercial aircraft the spoilers are used in cooperation with the ailerons to provide an aircraft rolling moment for turning. Thus, presently, both the left and right wing spoilers are deployed from their fully retracted to their fully extended position in response to a deflection of the speedbrake lever on the flight deck. Further, upon rotation of the control wheel, the spoilers are operated differentially. That is, to produce a rolling moment causing the aircraft to turn to its left, the spoilers on the left wing are raised whereas those on the right wing are lowered or maintained in their retracted position.

The spoiler systems known to the prior art have suffered from two significant disadvantages. Firstly, the aircraft rolling moment produced by the differential operation of the spoiler and ailerons has not been linearly related to rotation of the control wheel. It is preferable for both safety and ease of flying that the aircraft response be linear with respect to control deflection.

In addition, there are numerous spoilers used on an aircraft and, as such, the spoiler system normally is comprised of a large number of components. A failure of any one of these components may result in grounding the aircraft for repairs—an undesirable condition.

SUMMARY OF THE INVENTION

It is an object of this invention, therefore, to provide an improved aircraft spoiler system which is capable of producing a linear aircraft rolling moment as a function of control wheel rotation.

It is a further object of the invention to provide the above described improved aircraft spoiler system which includes sufficient fault detection and back up systems to allow aircraft operation even though one or more components in the system has failed.

It is a particular object of the invention to provide an improved aircraft spoiler system which is capable of individually programming the deployment of each spoiler in a spoiler array.

It is an additional object of the invention to provide an electric command spoiler system.

Briefly, according to the invention, an electric command spoiler system, intended for use in aircraft wherein a plurality of spoilers are deployed for both aircraft roll and speedbrake operation, comprises a plurality of electrically responsive spoiler actuators. Each actuator responds to a control signal to actuate an associated spoiler to a predetermined deflection between its fully retracted and fully deployed positions. Suitable means produces a roll command signal representative of commanded roll. In addition, a speedbrake command signal is produced which is representative of commanded speedbrake operation. A logic control is responsive to the roll and speedbrake command signals for producing at least two unique predetermined actuator command signals. The logic control further includes a means which couples each of the unique actuator command signals to at least a selected one of the spoiler actuators such that the spoilers on the aircraft are deployed at differing deflections.

DETAILED DESCRIPTION OF THE PREFERRED EMBODIMENT OF THE INVENTION

Figure 1:
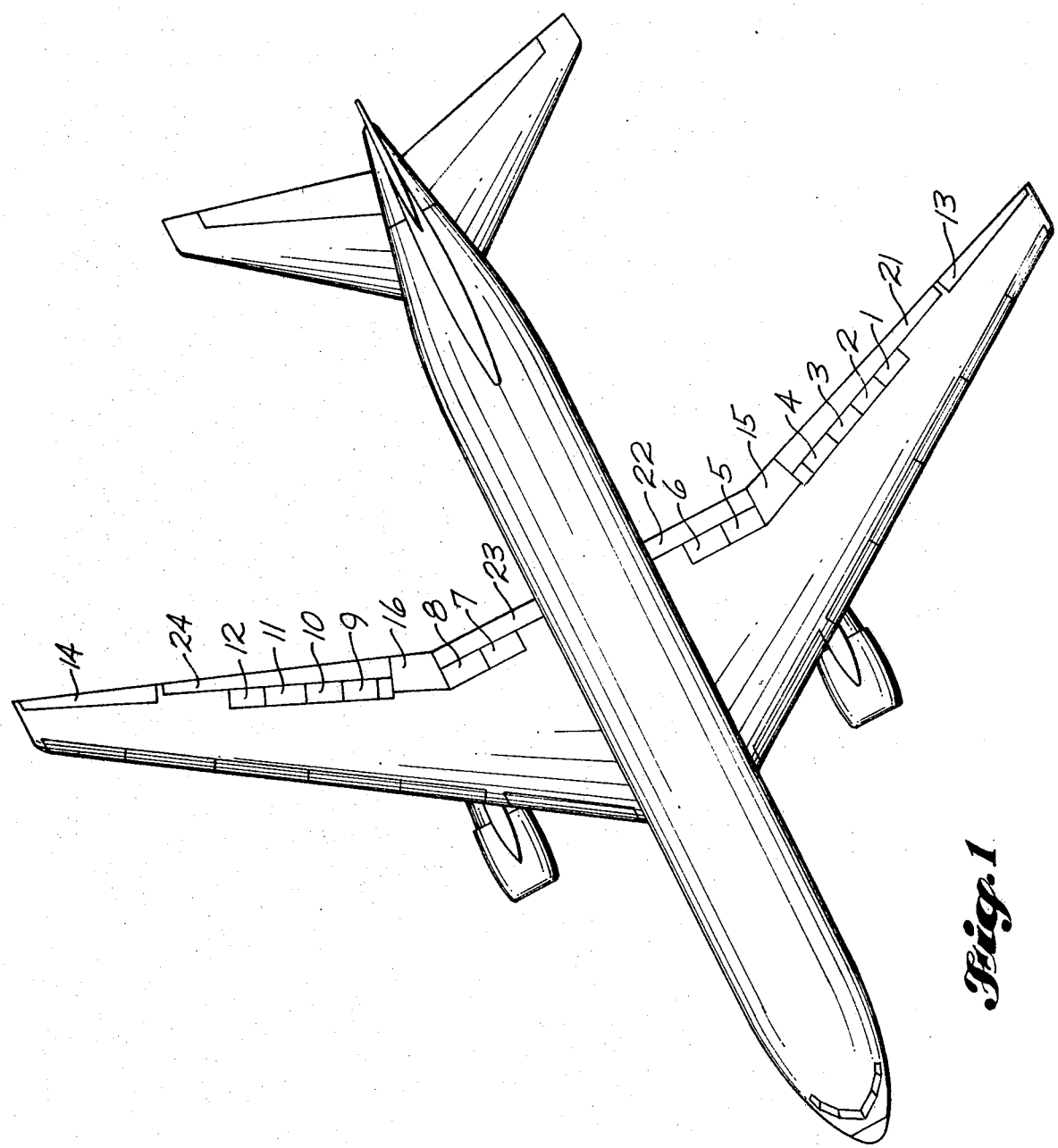
FIG. 1 is a top view of an aircraft illustrating inboard and outboard spoiler position.

FIG. 1 is a top view of a modern commercial aircraft. The aircraft is provided with four left outboard spoilers 1-4, two left inboard spoilers 5-6, two right inboard spoilers 7, 8 and four right outboard spoilers 9-12. Left and right outboard ailerons 13, 14 and left and right inboard ailerons 15, 16, respectively are also provided. The spoilers 1-12 and ailerons 13-16 are control surfaces which may be deployed by actuators (not shown) to a given angle with respect to the wing. In the case of the spoilers, these control surfaces may be raised from a fully retracted position flush with the wing to a fully deployed angle extending from the wing.

In this aircraft, the spoilers are used both as speedbrakes and as control surfaces for providing, in cooperation with the ailerons, a rolling moment to the aircraft for turning. A speedbrake lever (not shown), provided in the cockpit controls the position of all spoilers in any position from the fully retracted to the fully deployed position. Rotation of the control wheel, however, causes a differential deployment of the spoilers. That is, should, for example, the pilot rotate the control wheel in the clockwise direction thus commanding a roll maneuvering the aircraft to the right, the spoilers on the right wing would be raised whereas those on the left wing would retract, unless they were already at the partly retracted position.

In prior art spoiler control systems, it was found that the rolling moment produced by the spoilers, in cooperation with the ailerons, was not linear as a function of linear rotation of the control wheel. It was determined that, for example, the angle of the flaps, such as flaps 21-24 of FIG. 1, was a contributing factor to this nonlinear response. In order to provide a linear rolling moment with control wheel rotation, according to the present invention, each of the aircraft's spoilers 1-12 is driven by its own electrically responsive actuator (not shown). In the manner described in detail hereafter, various spoilers are deflected at predetermined angles to provide the desired linear roll response.

Figure 2:
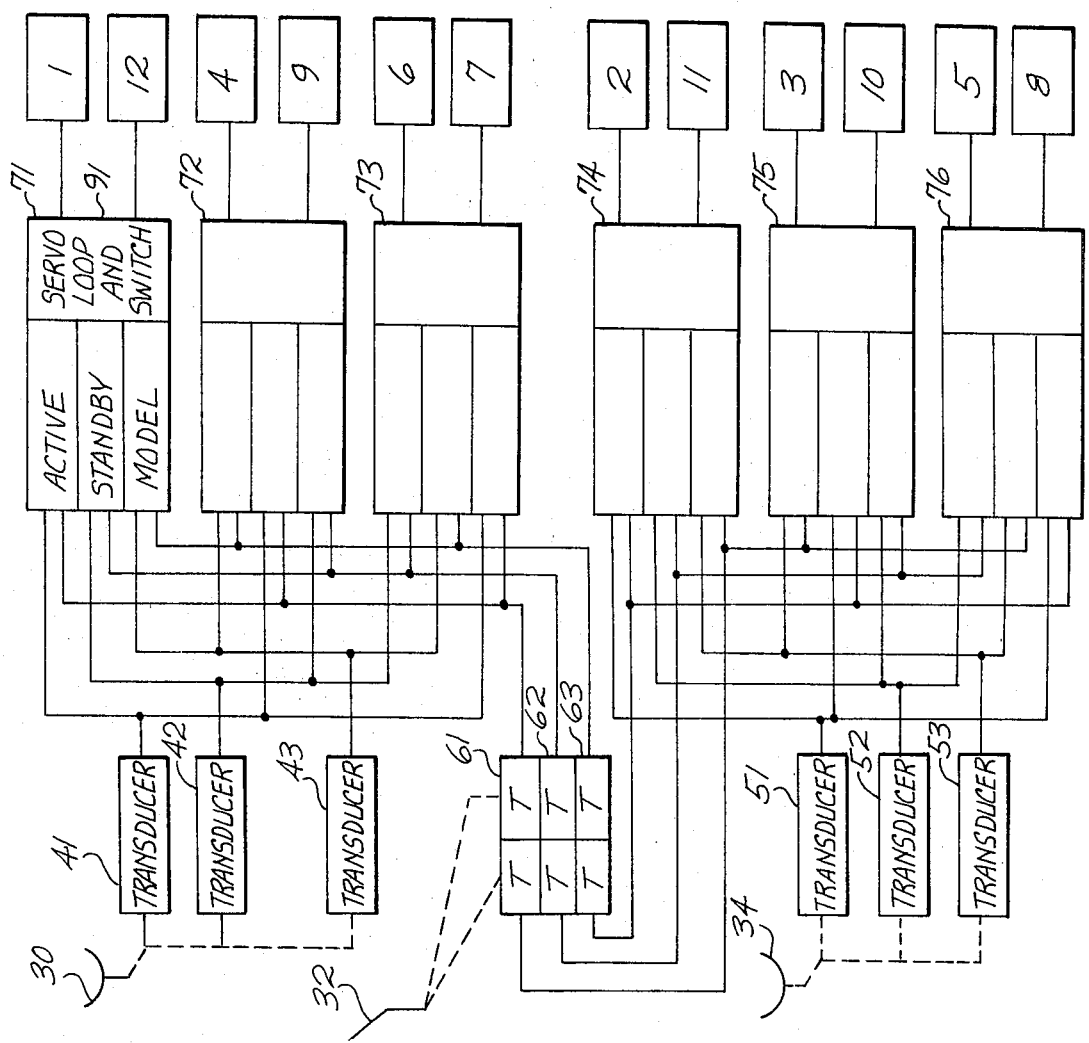
FIG. 2 is a block diagram illustrating the preferred embodiment of a complete multichannel electric command spoiler system.

FIG. 2 is a block diagram illustrating the preferred arrangement of the electric command spoiler system. Here, shown schematically, are the pilot's control wheel 30, the speedbrake lever 32 and the copilot's control wheel 34. In the conventional manner, the pilot's control wheel 30 and copilot's control wheel 34 are mechanically interlocked such that they move in unison. To roll the aircraft either to the right or left, the pilot or copilot rotates his control wheel in the desired direction. The position of each control wheel 30, 34 is transduced to a representive electrical signal by a series of three transducers 41–43 coupled to the pilot's control wheel 30 and three transducers 51–53 coupled to the copilot's control wheel 34. While numerous position transducers are known to this art, in this, the preferred embodiment of the invention the transducers 41–43 and 51–53 are linear variable differential transformers which produce an output AC voltage having an amplitude corresponding to control wheel position.

In a similar manner, a series of three dual transducers 61–63 monitor the position of speedbrake lever 32. In the conventional manner, the speedbrake lever 32 is deflected by either the pilot or copilot to create a corresponding deployment of all spoilers. Thus, the speedbrake lever 32 may be used to deploy all spoilers from their fully retracted to their fully extended positions. The dual transducers 61–63 are also, preferably, linear variable differential transformers which produce an AC voltage having an amplitude representative of speedbrake deflection.

The control wheel transducers 41–43, 51–53 and speedbrake transducers 61–63 connect to six control blocks 71–76. The topology of each control block 71–76 (which is described in detail with respect to FIG. 3) is essentially the same for each control block and, as such, only control block 71 will be discussed herein.

Control block 71 is comprised of an active channel 81, a standby channel 82 and a model channel 83. As shown, each channel 81–83 is supplied information from a different one of the control wheel transducers 41–43 and a different one of the speedbrake transducers 61–63. In a manner described more fully with respect to FIG. 3, each channel 81–83 processes its input signals and produces left and right spoiler control signals. Normally, the spoiler control signals generated by the active channel 81 are output through the servo loop and switch portion 91 of control block 71 where they are then coupled to a spoiler pair. Here it should be noted that each control block 71–76 connects to a left and right corresponding pair of spoilers. Control block 71, for example, couples to the outermost left and right spoilers 1 and 12.

Figure 4:
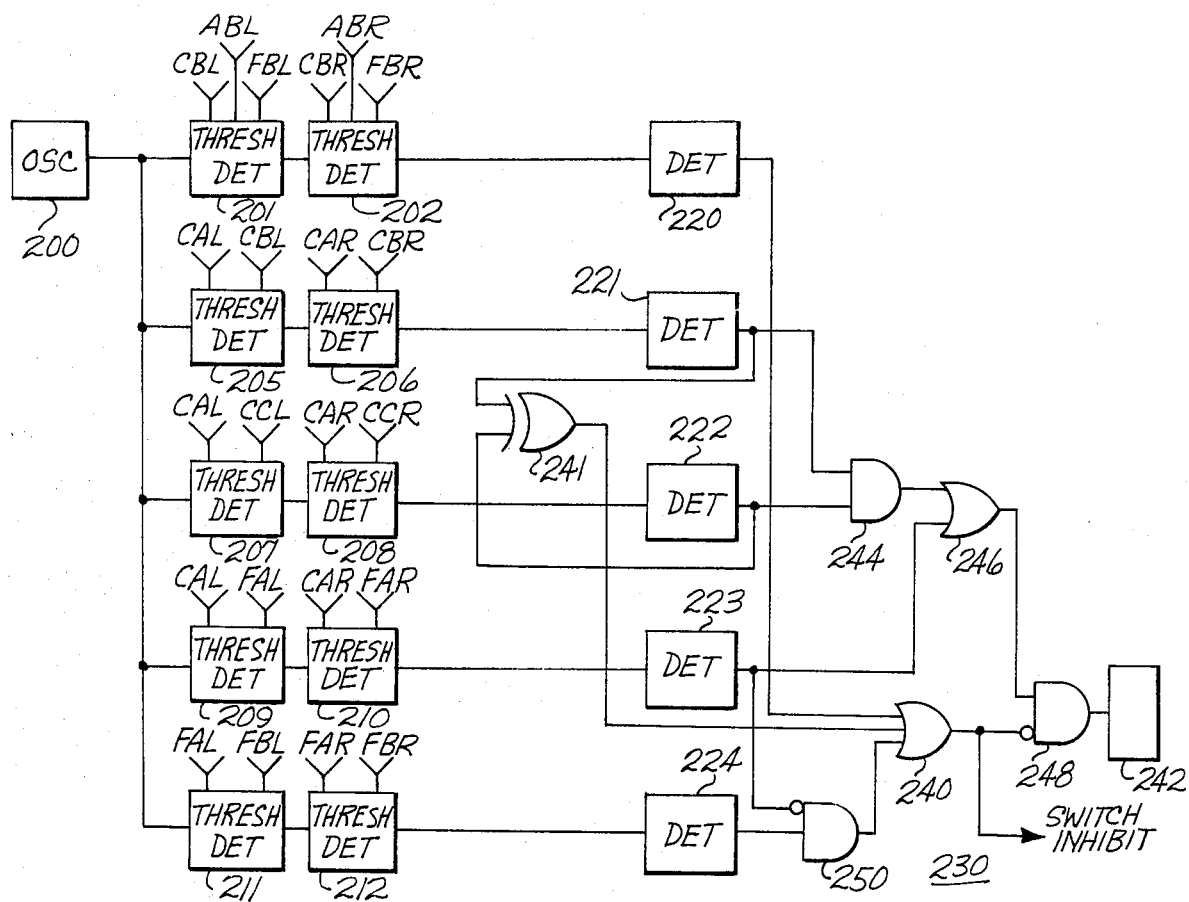
FIG. 4 illustrates preferred fault detection and switching circuitry.

Fault detection circuitry, which is described in detail with respect to FIG. 4, monitors the active and standby channels 81, 82 comparing their outputs with the signals generated by the model channel 83. If the active channel 81 deviates from the standby and the model by a predetermined threshold level, the active channel 81 is switched out of the system and the standby channel 82 is switched in. However, should the fault detection system detect a fault on the standby or model channel before a fault occurs on the active channel an inhibit operation occurs whereby switching to the standby channel upon an active channel fault is inhibited. In this manner, despite failures of certain channels, the aircraft may be flown with the flight crew retaining full control over spoiler position.

Figure 3:
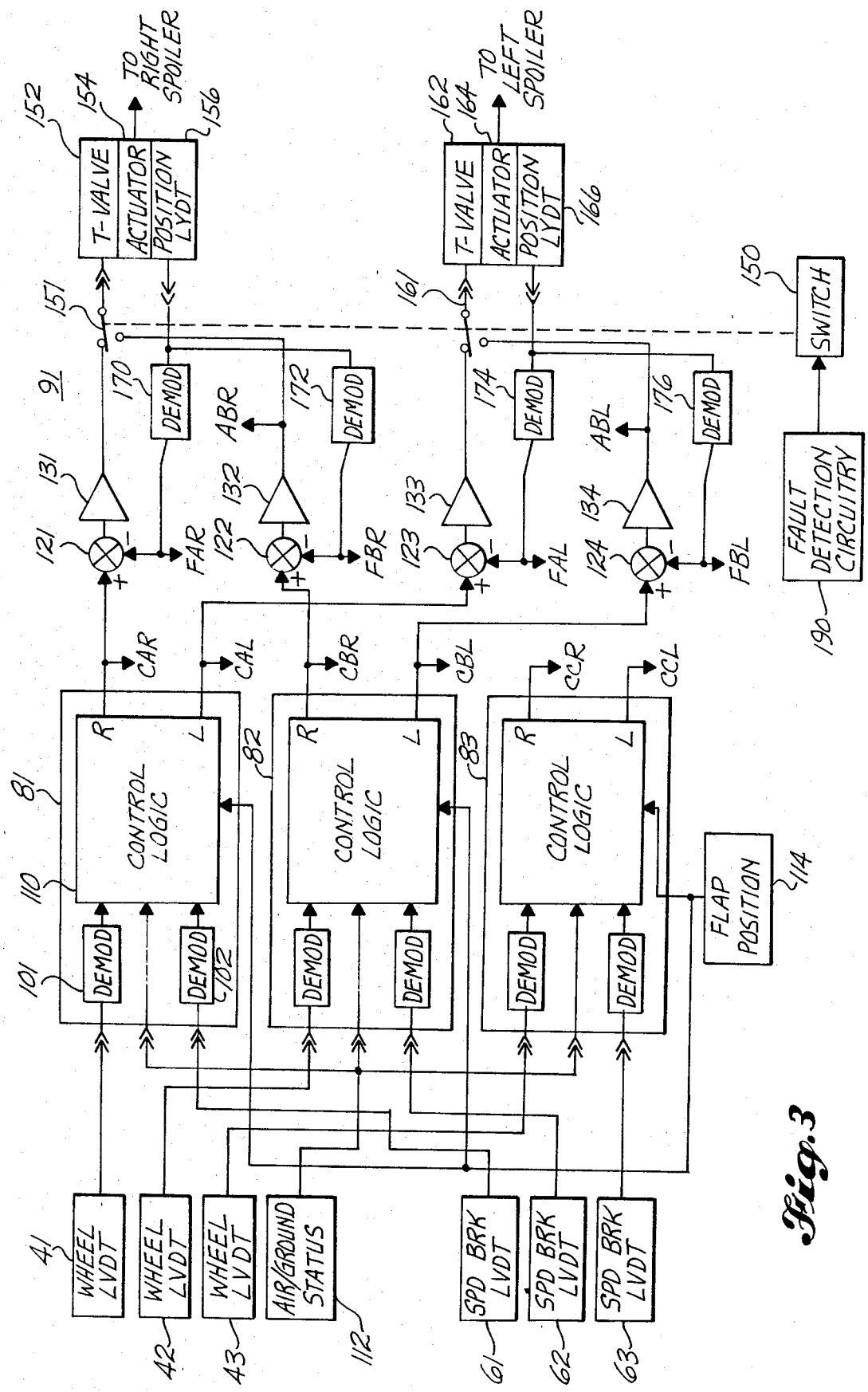
FIG. 3 is a detailed block diagram of a representative channel shown in FIG. 2.

FIG. 3 is a detailed diagram showing the preferred construction of control block 71 of FIG. 2. While the discussion herein below specifically relates to control block 71, it should be understood that this topology is used for each of the other control blocks 72–76 of FIG. 2. The only differences between the control blocks relates to the particular sources of input signals and to the wheel programs, as will be understood more clearly hereafter.

The control block 71 is comprised of an active channel 81, a standby channel 82, a model channel 83 and the servo loop and switch circuitry, indicated generally at 91.

The input signals to each channel 81–83 include an output from one of the control wheel linear variable differential transducers (LVDT) and the output from one of the speedbrake LVDT's 61–63. Thus, each channel receives a unique wheel and speedbrake position signal.

Since each of the channels 81–83 contains the same circuit topology, the following discussion will refer only to channel 81.

The AC signals from the control wheel transducer 41 and speedbrake transducer 61 are demodulated to corresponding DC signals by demodulators 101, 102, respectively. The resulting DC signals are inputs to a control logic circuit 110.

Also supplied as input signals to control logic circuit 110 is the output from an air ground status block 112, indicative of whether the aircraft is in the air or on the ground, and the output from a flap position block 114. Flap position block 114 provides a DC control signal representative of the angle of the aircraft's flaps. Implementation of the air/ground status block 112 and the flap position block 114 are well known to those skilled in the art and, as such, will not be disscussed herein.

In response to its various input signals, the control logic circuit 110 produces predetermined right and left spoiler actuator command signals, CAR, CAL respectively, in accordance with its internal programming. FIGS. 5–11 illustrate the desired output signals for various control wheel commands, speedbrake commands, flap positions and aircraft air/ground status. While a detailed description of the implementation of the control logic circuitry 110 is not given herein, such circuitry would be easily implemented given the instant specification without undue experimentation. It is contemplated that the control logic circuitry 110 may be implemented using analog or digital circuitry.

Whereas the output signals from active channel 81 are CAR and CAL, the corresponding signals out of the standby channel 82 are CBR and CBL whereas those out of the model channel 83 are CCR and CCL. All output signals from the channels 81–83 are fed to the fault detection circuitry, discussed in detail with respect to FIG. 4, whereas only those output signals from the active channel 81 and standby channel 82 are fed to the servo loop and switch circuitry 91.

The servo loop and switching circuitry 91 includes four summing circuits 121–124, each of which receives one of the output signals from the active and standby channels 81 and 82. The output from each summer couples to an amplifier 131–134. A series of switches, all of which are indicated by block 150, determine which of the amplifier 131–134 outputs are coupled to the spoiler actuator. Thus, a switch 151 determines whether the output from amplifier 131 or output from amplifier 132 controls the right spoiler via a conventional servo valve 152 and spoiler actuator 154. Correspondingly, a switch 161 determines whether the output from amplifier 133 or the output from amplifier 134 is coupled to the servo valve 162 and thence to the spoiler actuator 164 for controlling the left spoiler. In the switch positions shown, the switches 151 and 161 are selecting the active channel right and left outputs, respectively.

To complete the servo loop, a pair of position linear variable differential transformers 156 and 166 produce an output AC signal having a magnitude corresponding to the position of the right and left spoilers, respectively. The output from the right position transducer 156 is demodulated to corresponding amplitude DC signals via demodulators 170, 172 whereas the output from the left position transducer 166 is demodulated to corresponding amplitude DC signals via demodulators 174 and 176. The various demodulator output signals, to wit FAR, FBR, FAL and FBL are used as diagnostic input signals to the fault detection circuitry, as is clearly shown in FIG. 4.

In the well known manner, the amplifiers 131-134 will produce an output signal which by driving the spoiler tends to reduce the difference between the signals at its corresponding summer 121-124 to a small error value. In this way, the spoilers are driven to a desired position.

Fault detection circuitry 190 is provided which monitors the various diagnostic signals and, should a fault be detected in the active channel signals, the active channel is switched out of being coupled to the spoilers and the standby channel signals are coupled to the spoilers.

Thus, the present design provides a means for maintaining control of each aircraft spoiler despite a failure in one or more of the active channels.

FIG. 4 is a detailed diagram illustrating the preferred embodiment of the fault detection circuitry for use in the electric command spoiler system.

The failure detection circuitry is comprised of an oscillator 200, a series of threshold detectors 201-212, five detectors 220-224 and logic circuitry indicated generally at 230.

The oscillator 200 produces an AC reference signal which, in this the preferred embodiment of the invention, is 400 Hertz. Each of the threshold detectors 201-212 will pass a reference signal from its input to its output if and only if the difference between the signals sensed at its sense inputs is less than a predetermined threshold level. Should the threshold level be exceeded, a reference signal is blocked from being passed to the threshold detector output. The detectors 220-224 produce an output logic "zero" level if the AC reference signal is coupled to its input, each detector otherwise produces an output logic "one" level.

The threshold detectors 201, 202 test for faults in the standby channel servo amplifiers (such as channel 82 of FIG. 3). Threshold detector 201 compares the sum of the left standby command signal and the left feedback signal with the left standby servo amplifier signal. A failure, such as in an associated amplifier, summing circuit or feedback circuit creates a large disparity between the signals whereby the threshold detector blocks the signal from oscillator 200 from appearing at its output.

In a similar manner, threshold detector 202 compares the command, feedback and servo amplifier signals for the standby right channel.

Thus, the signal from oscillator 200 reaches detector 220 only if each threshold detector 201-202 receives diagnostic signals having a difference within a determined threshold value.

If detector 220 does not receive the oscillator 200 signal, this indicates a fault in the standby channel and a logic one level is applied to one input of an OR gate 240. OR gate 240 will thus be satisfied and activate its output to a high level which indicates a switch inhibit condition on an associated indicator 242. The switch inhibit condition indicates a failure in the back up system whereby the system, via logic described herein below, will not allow switching from the active to the standby channel.

Threshold detectors 205-208 compare the active channel command signals against the standby and model channels. Thus, the oscillator 200 signal reaches detector 221 only if the command signals for the left and right active channel are within the threshold set by threshold detectors 205 and 206 with the command signals for the standby left and right channels. Similarly, the oscillator 200 signal reaches detector 222 only if the command signals for the active left and right channels are within thresholds determined by threshold detectors 207 and 208 for the command signals produced by the model left and right channels. The output from detectors 221 and 222 feed to an AND gate 244. Since the detectors 221, 222 produce a logic one level only if they do not receive the oscillator signal, AND gate 244 activates its output high only if the active channel is significantly different from both the standby and the model channel. If this occurs, OR gate 246 is satisfied whereby it activates its output which is coupled to AND gate 248. Due to an inversion at the remaining input of AND gate 248, AND gate 248 activates its output high only if the output from OR gate 240 is low. This system corresponds to a not-inhibit condition, i.e. the standby channel operating properly. Thus, upon receiving an output from OR gate 246 indicating that the active channel is different from both the standby and the model channels and by there being no inhibit imposed, AND gate 248 is satisfied and it activates switch 150 which, as is shown in FIG. 3, results in switching the system from active channel control to standby channel control.

The output of detectors 221 and 222 also feed to an EXCLUSIVE OR gate 241. Since the detectors 221, 222 produce a logic one level only if they do not receive the oscillator signal, EXCLUSIVE OR gate 241 activates its output high only if either the standby or the model channel, but not both, are significantly different from the active channel. If this occurs, EXCLUSIVE OR gate 241 causes OR gate 240 to activate its output high, thereby resulting in a switch inhibit command.

Threshold detectors 209 and 210 detect a malfunction in the servo loops of the left and right, respectively active channels. Due to servo loop operation, the feedback signals, FAL and FAR, should be approximately equal to the corresponding command signals CAL and CAR. Should a failure occur in one of the servo loops the command signal will vary from the feedback by an amount exceeding the threshold level whereby the output from detector 223 will go to a logic "1" state. This, through OR gate 246 and AND gate 248 result in the switching of the system via switch 150 to the standby channels unless a switch inhibit condition exists.

The output from detector 223 is inverted and passed as one input to an AND gate 250. The remaining input to AND gate 250 is the output of detector 224 which responds to threshold detectors 211, 212. These two detectors test for a failure of a demodulator in the standby channel, such as demodulators 172, and 176 of FIG. 3. As is seen in FIG. 3, the output from transducer 156 feeds to both demodulator 170 and demodulator 172. Thus, if both demodulators are operating properly then the signal FAR should be approximately equal to FBR. For the same reason, the signal FAL should be approximately equal to the signal FBL. If either of these pairs vary by more than the threshold amount, this signifies that a demodulator in either the active or the standby channel is in a fault condition. Notice however that if a demodulator in the active channel fails then the output from detector 223 is at a logic "1" level. This, when inverted, results in a zero input to AND gate 250 and, as such, AND gate 250 does not create a switch inhibit through NOR gate 240. Thus, with the failure in the active channel, the system can switch to the standby channel.

However, if the demodulator in the standby channel fails then the output from detector 223 is at a logic low which is inverted to a logic high at AND gate 250. Also, the output from detector 224 goes high whereby AND gate 250 couples a switch inhibit signal through OR gate 240. This, then, prevents the system from switching to the standby channel.

FIGS. 5 through 11 are graphs illustrating the desired spoiler panel position as a function of control wheel and speedbrake inputs. Thus, the system control logic, such as control logic block 110 of FIG. 3, would be designed to implement the spoiler panel deflections indicated by these curves. The curves were selected to provide a linear rolling moment of the aircraft shown in FIG. 1 as a function of control wheel rotation. It should be understood, however, that this particular functional implementation does not limit the scope of the invention.

Figure 5:
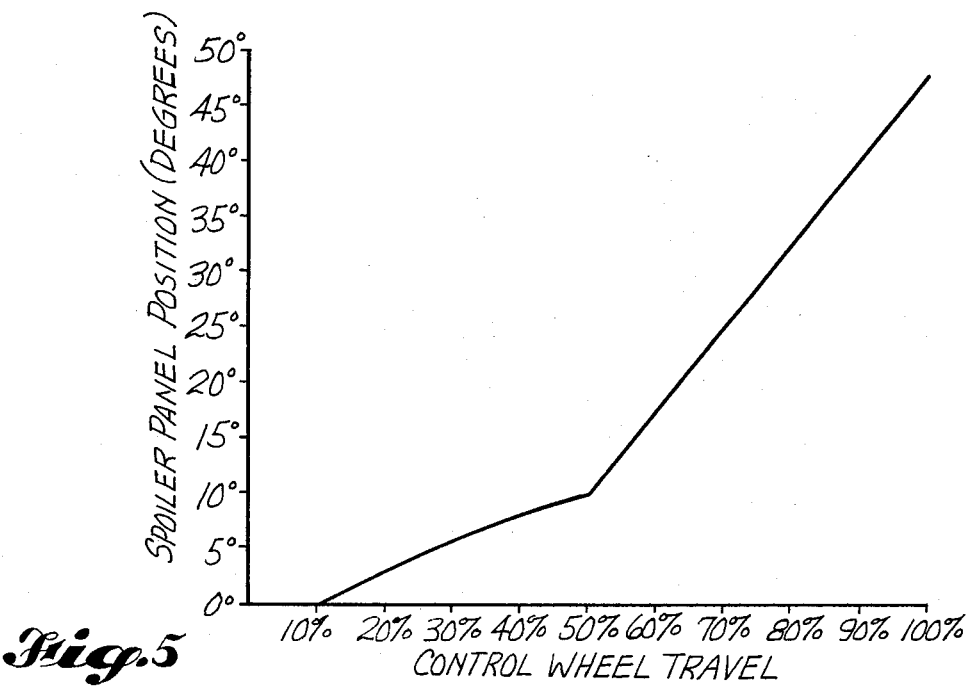

FIG. 5 shows spoiler panel position as a function of control wheel position. Here, it should be understood that 100 percent control wheel travel corresponds to ±65° control wheel rotation. The particular curve shown in FIG. 5 applies only to the outboard spoiler panels i.e. 1-4 and 9-12 of FIG. 1, for the condition of the flaps being at less than 10°.

Figure 6:
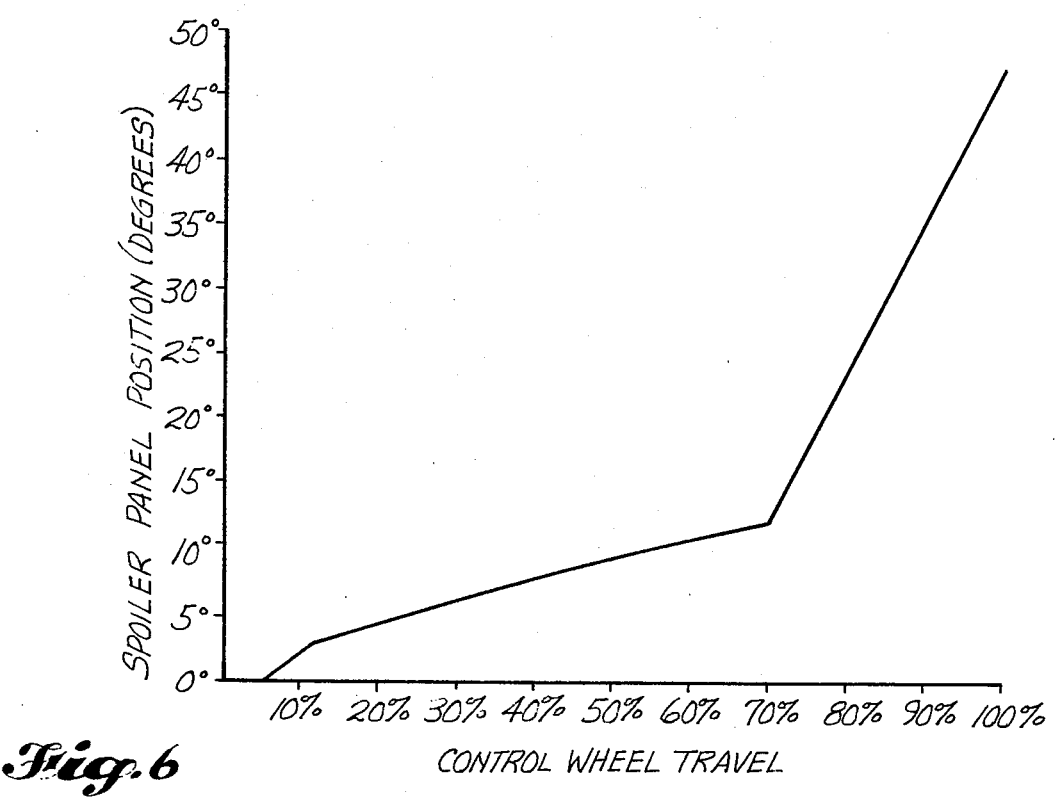

FIG. 6 illustrates the desired outboard spoiler panel deflection for the condition of the flaps being deployed at greater than or equal to 10°.

Figure 7:
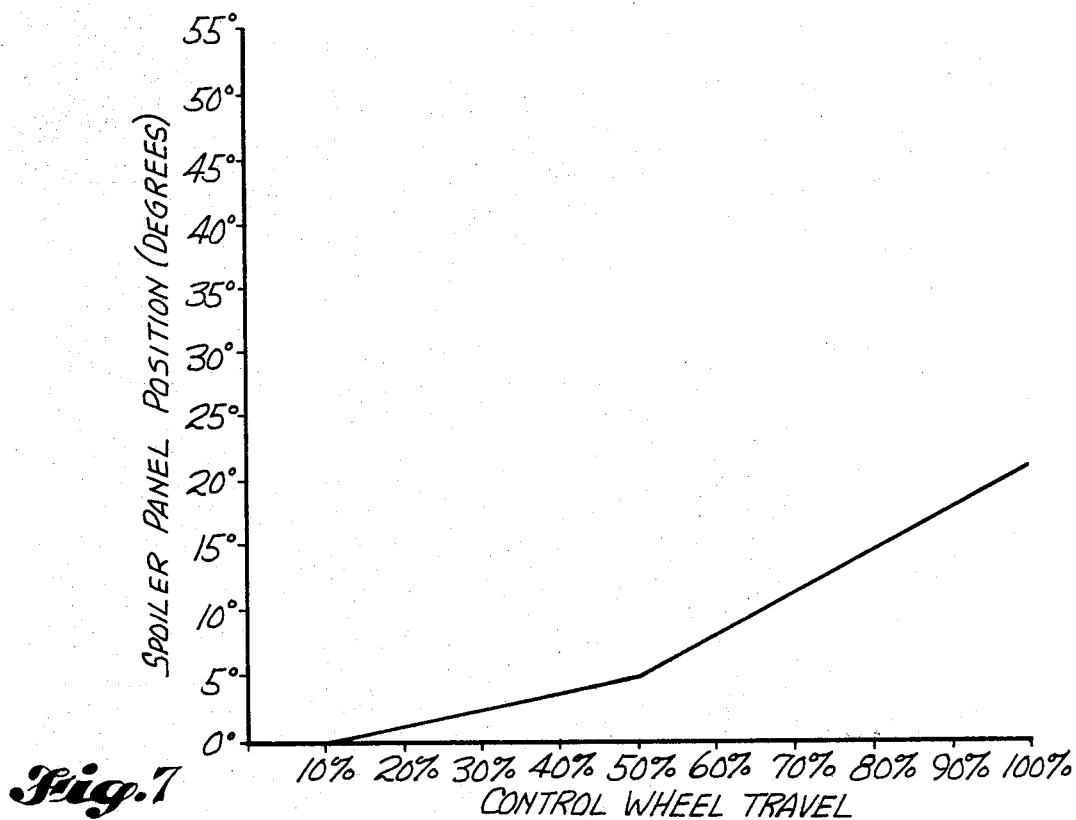

FIG. 7 illustrates the desired position of the inboard spoiler panels i.e. panels 5-8 of FIG. 1, for the condition of the flaps being at less than 10°.

Figure 8:
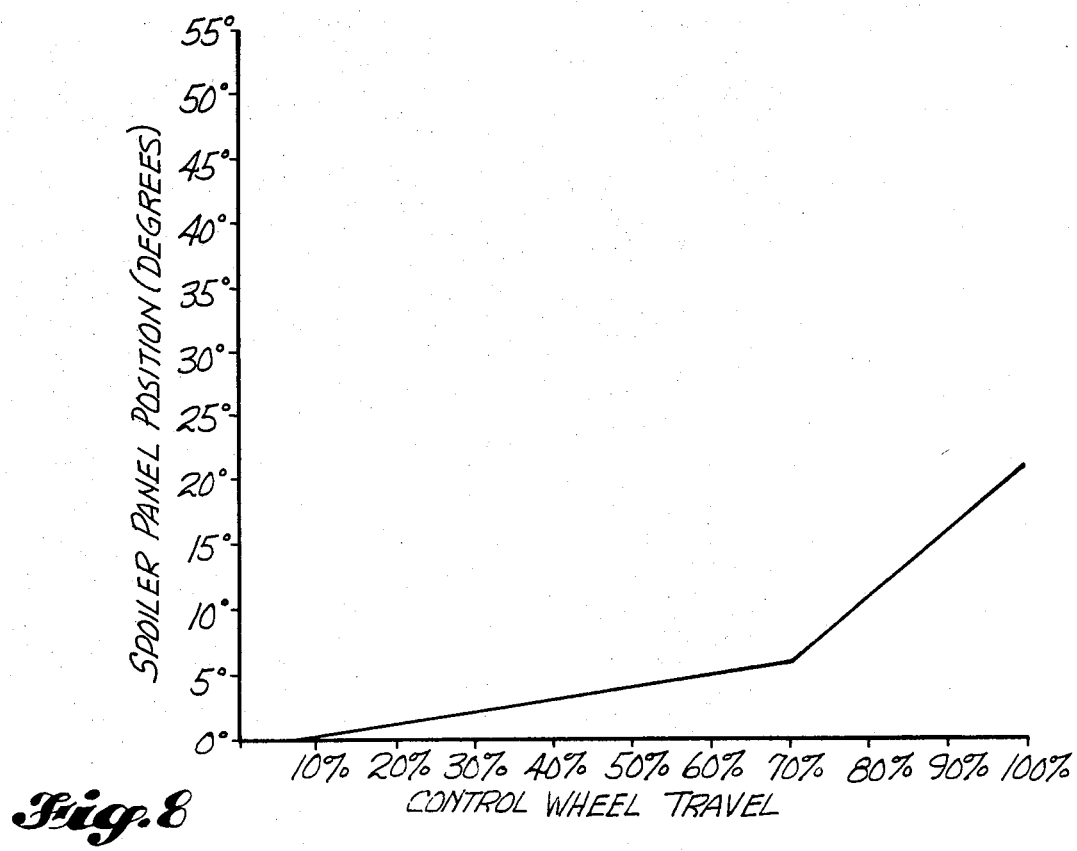

FIG. 8 illustrates the desired position of the inboard panels for the flaps being at greater than or equal to 10°.

Figure 9:
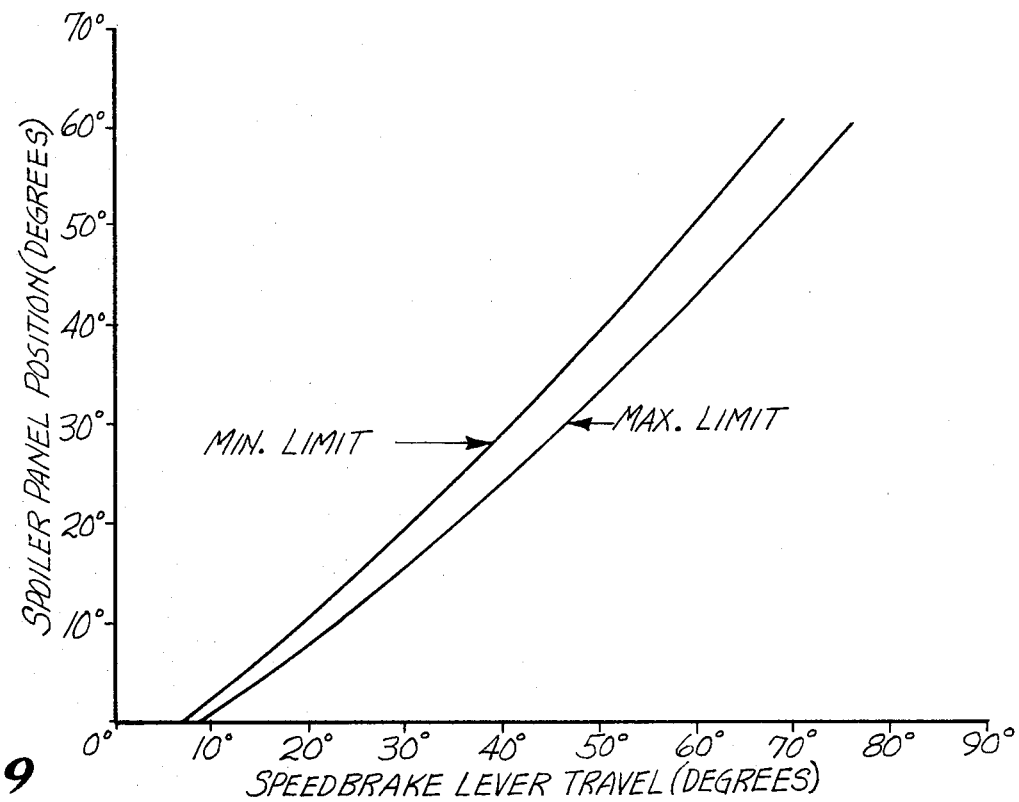

FIG. 9 illustrates the desired spoiler panel minimum and maximum limits as a function of speedbrake lever travel for the condition of the aircraft being on the ground.

Figure 10:
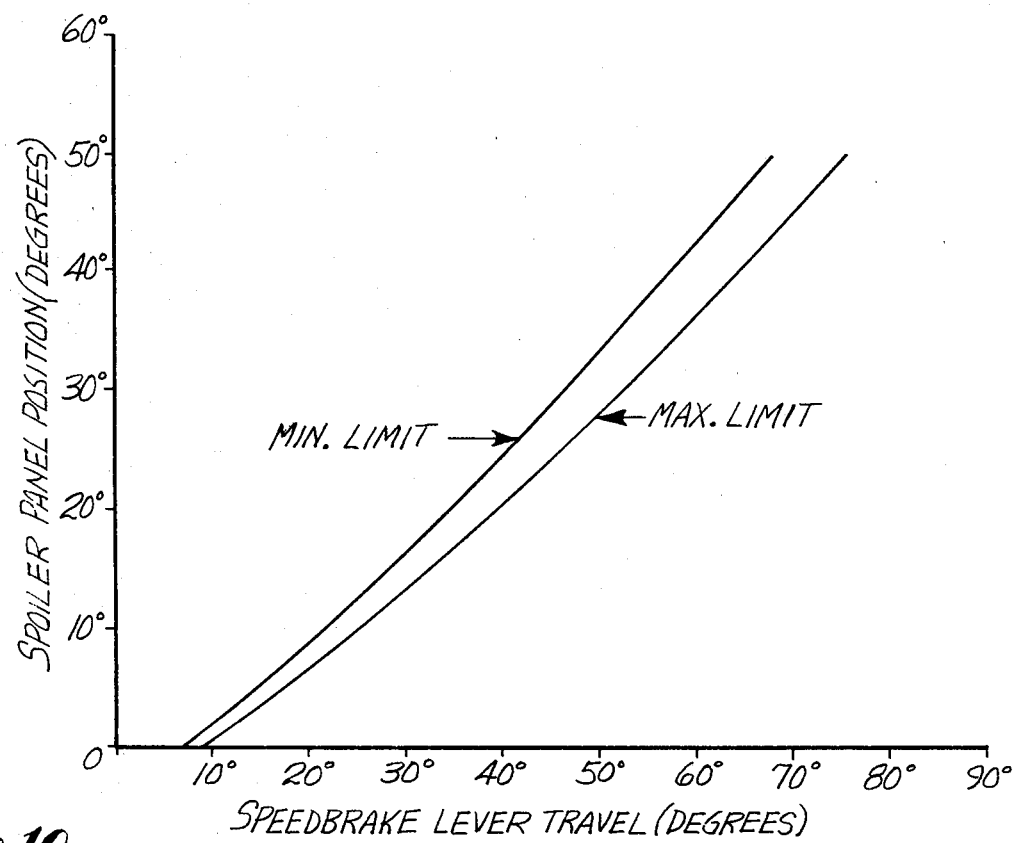

FIG. 10 illustrates the desired minimum and maximum limits of the outboard spoiler panels, i.e. 1-4 and 9-10 of FIG. 1, for the condition of the aircraft being airborne.

Figure 11:
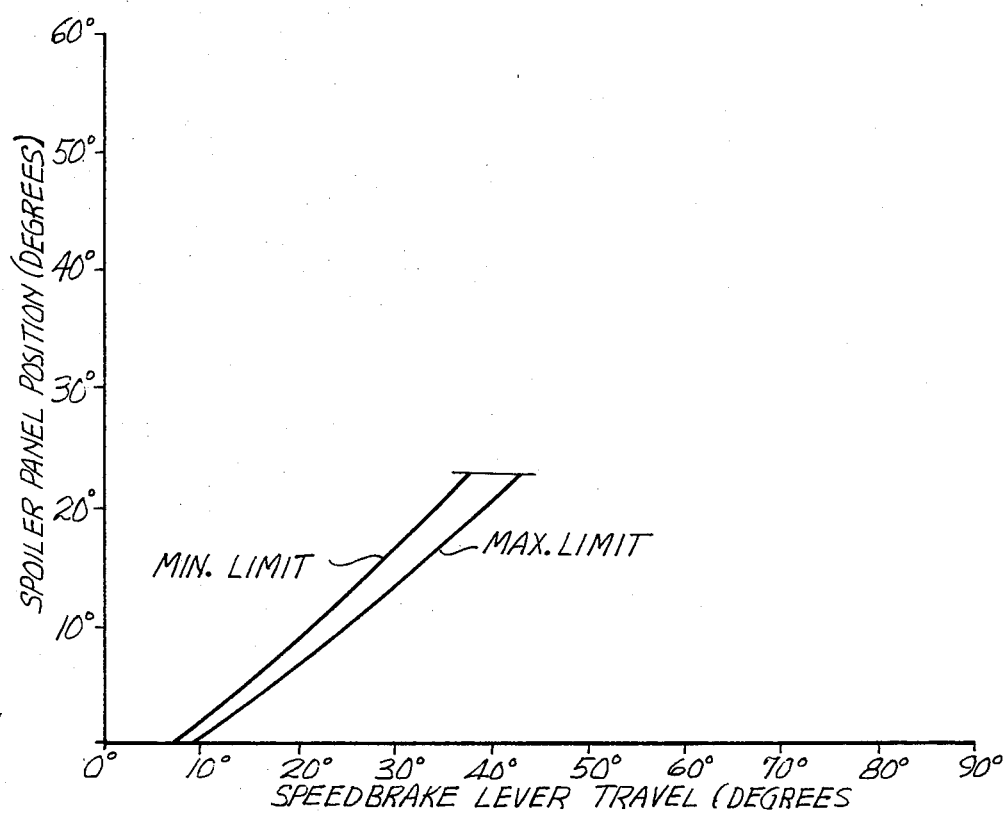
FIGS. 5-11 are graphs illustrating preferred spoiler deployment, for various aircraft conditions, which produce a linear aircraft rolling moment as a function of control wheel rotation.

FIG. 11 illustrates the minimum and maximum spoiler positions as a function of speedbrake lever travel for the inboard spoiler panels, i.e. panels 5-8 of FIG. 1, for the condition of the aircraft being in the air.

Thus, an electric command spoiler system has been disclosed which is capable of independently controlling each spoiler on the aircraft to tailor spoiler response to a desired goal such as linear roll response. The systems redundancy and fault detection circuitry allows positive control of the spoilers even if faults should occur.

While the preferred embodiment of the invention has been described in detail, it should be apparent that many modifications and variations thereto are possible all of which fall within the true spirit and scope of the invention.

We claim:

1. An electric command spoiler system for use in aircraft wherein a plurality of spoilers are deployed for both aircraft roll and speedbrake operation, the system comprising:

a plurality of electrically responsive spoiler actuator means, each actuator means responding to a control signal to actuate an associated spoiler to a predetermined deflection between its fully retracted and fully deployed positions;
roll command means for producing a roll command signal representative of commanded roll;
speedbrake command means for producing a speedbrake command signal representative of a commanded speedbrake condition;
flap position transducer means for producing a signal representative of the aircraft's flap position; and
logic control means responsive to said roll and speedbrake command signals and said flap position transducer produced signal for producing at least two unique predetermined actuator command signals, said logic control means including means for coupling each of said unique actuator command signals to at least a predetermined one of said spoiler actuators such that differing spoiler deflections are produced.

2. The electric command spoiler system of claim 1 further comprising:
aircraft status means for producing a signal indicative of whether the aircraft is airborne or on the ground; and
wherein said logic control means is also predeterminedly responsive to said aircraft status means produced signal for producing said actuator command signals.

3. The electric command spoiler system of either of claims 1 or 2 wherein said logic control means produced actuator control signals cause a linear aircraft rolling moment as a function of linear roll command signals.

4. The electric command spoiler system of either of claims 1 or 2 wherein said logic control means further comprises:
fault detector means for detecting an erroneous actuator control signal;
back up means producing back up actuator control signals; and
switching means responsive to said fault detector means for switching out an erroneous actuator control signal to prevent said erroneous actuator control signal from being coupled to said spoiler actuators and switching in said back up actuator control signal to said spoiler actuators.

5. The electric command spoiler system of claim 4 wherein:
said roll command means produces a plurality of redundant roll command signals;
said speedbrake command means produces a plurality of redundant speedbrake command signals; and
wherein said logic control means produces an active actuator control signal responsive to a predetermined first pair of roll and speedbrake command signals and said back up means produced actuator control signal is produced responsive to a predetermined second pair of roll and speedbrake command signals.

6. The electric command spoiler of claim 5 wherein said fault detector means comprises:
means responsive to a third pair of said roll and speedbrake commands for generating a model actuator control signal; and
threshold detector means for comparing said active actuator control signal with said model actuator control signal and producing a fault signal in response to a predetermined difference therebetween;
and wherein said switching means includes means responsive to a produced fault signal for switching out said active actuator control signal and switching in said back up actuator signal.

7. The electric command spoiler of claim 6 wherein the logic control means further comprises:
inhibit means for detecting one of an erroneous back up and model actuator control signal and inhibiting the switching means in response thereto.

* * * * *